Sept. 28, 1943.   R. I. SCHONITZER ET AL   2,330,246
CONNECTING AND GUIDING MEANS FOR ENDLESS TRACKS AND THE LIKE
Filed Feb. 14, 1942   4 Sheets-Sheet 1

INVENTORS:
RUDOLPH I. SCHONITZER
EDWIN L. ALLEN
HAROLD B. MUSTER
BY Hyde and Meyer
ATTORNEYS.

Sept. 28, 1943. R. I. SCHONITZER ET AL 2,330,246
CONNECTING AND GUIDING MEANS FOR ENDLESS TRACKS AND THE LIKE
Filed Feb. 14, 1942 4 Sheets-Sheet 2
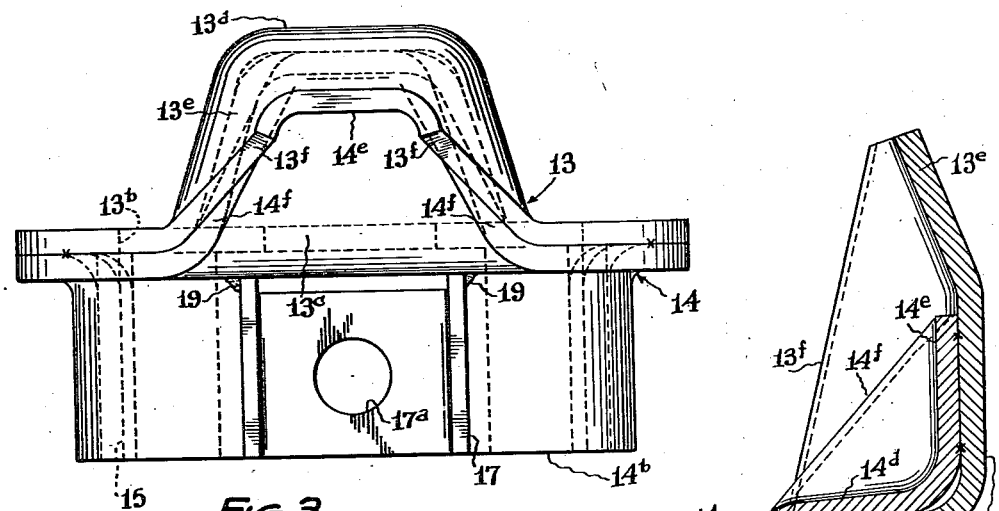
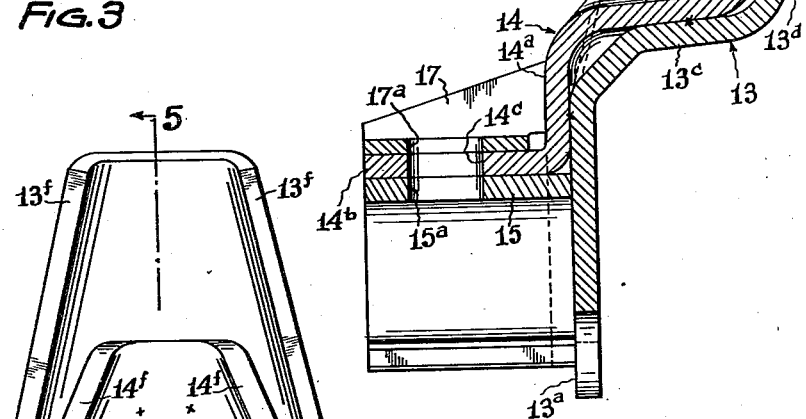
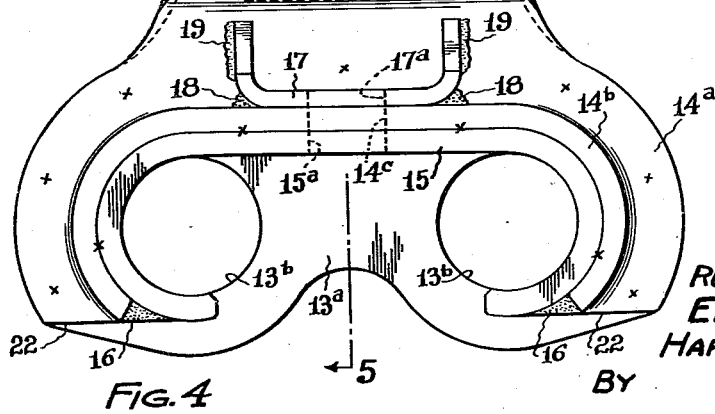
INVENTORS:
RUDOLPH I. SCHONITZER
EDWIN L. ALLEN
HAROLD B. MUSTER
BY
ATTORNEYS.

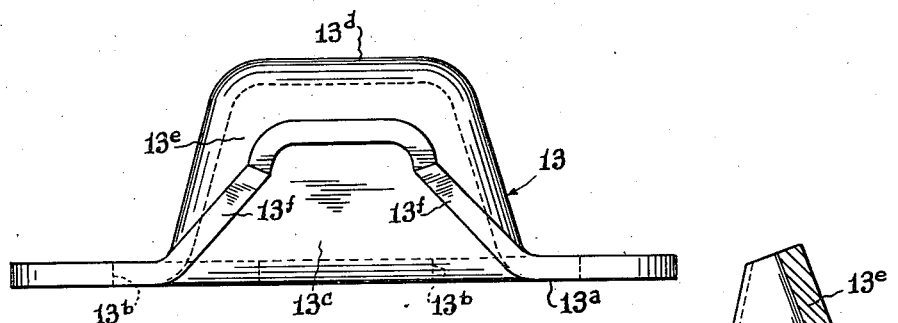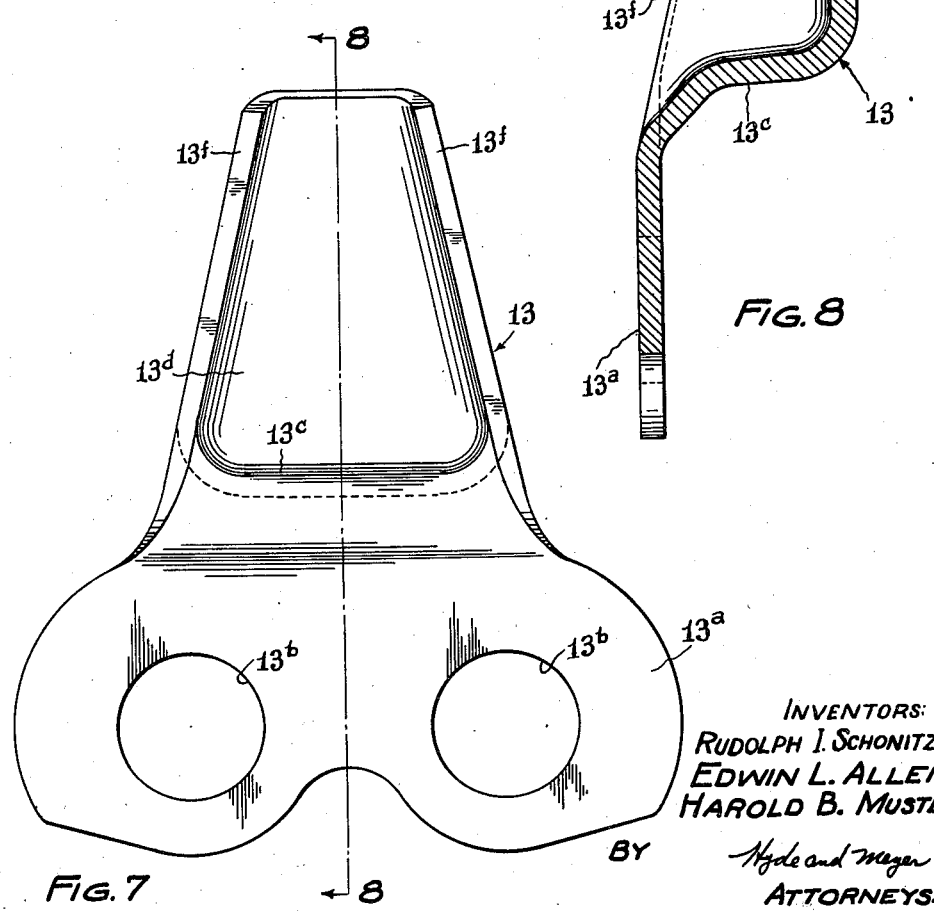

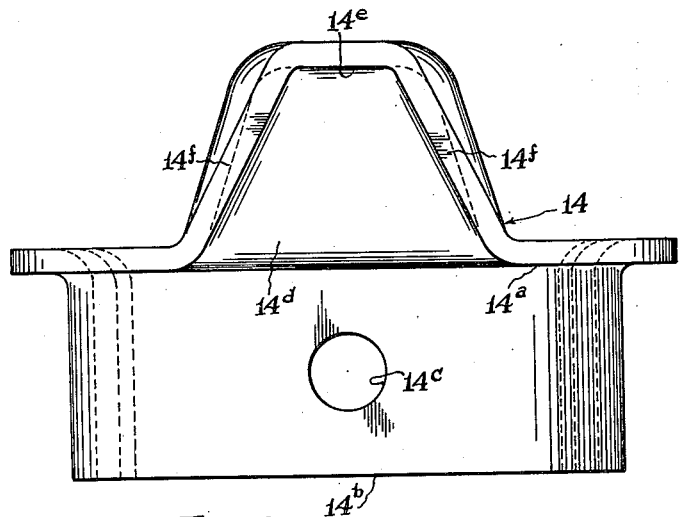
Fig. 9
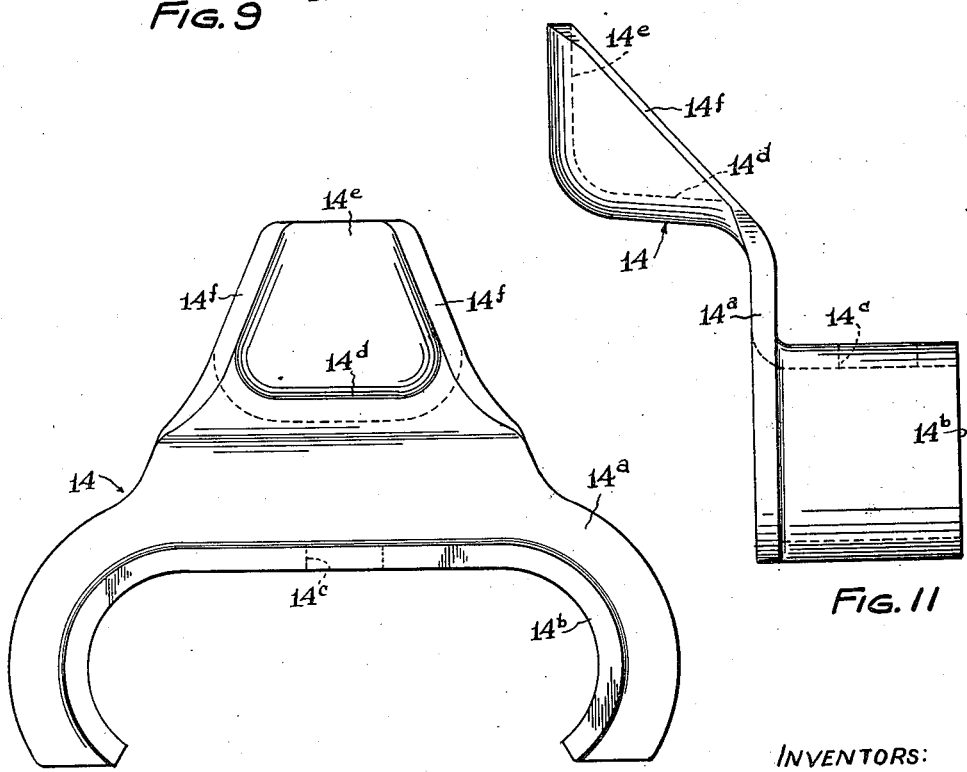
Fig. 10
Fig. 11
INVENTORS:
RUDOLPH I. SCHONITZER
EDWIN L. ALLEN
HAROLD B. MUSTER
BY Hyde and Meyer
ATTORNEYS.

Patented Sept. 28, 1943

2,330,246

UNITED STATES PATENT OFFICE 2,330,246

CONNECTING AND GUIDING MEANS FOR ENDLESS TRACKS AND THE LIKE

Rudolph I. Schonitzer, Shaker Heights, and Edwin L. Allen and Harold B. Muster, Cleveland Heights, Ohio; said Allen and said Muster assignors to said Schonitzer Application February 14, 1942, Serial No. 430,988

8 Claims. (Cl. 305—10)

This invention relates to an improvement in the construction of endless tracks having separate tread blocks, and relates to a combined end connector for adjacent tread blocks and a track guide for retaining the track on bogie wheels and sprockets.

Track guides and end connectors are in use comprised of forgings but these have many disadvantages which are overcome by our improved devices. In the present improvement the parts are formed of metal stampings welded together where necessary and it results from our improvements that great uniformity is possible, little or no machining is necessary after assembly, and harder wearing surfaces are provided by the proper selection of the metal for the stampings and of the heat treatment to which they are submitted. It follows from this that our improved devices are less costly to produce, are suitable for mass production, and give more satisfactory results in use.

One of the objects of the present invention therefore is to provide a device of this sort which can be formed of sheet metal stampings connected together by welding and provided with reinforcing flanges, ribs and projections and reinforcing plates where necessary or desirable so as to obtain all of the advantages pointed out in the preceding paragraph. The nature of our invention will be more clearly understood from the accompanying drawings and description and the essential features thereof will be set forth in the claims.

In the drawings,

Fig. 3 is an enlarged top plan view of the combined track guide and end connector shown in Figs. 1 and 2;

Fig. 4 is a front elevational view of the device of Fig. 3;

Fig. 5 is a sectional view of the same taken along the line 5—5 of Fig. 4;

Figs. 6 and 7 are top plan and front elevational views respectively of the main stamping forming a part of the device of Figs. 3, 4 and 5;

Fig. 8 is a sectional view taken along the line 8—8 of Fig. 7; while

Figs. 9, 10 and 11 are top plan, front elevational and side elevational views respectively of one of the smaller stampings of the device shown in Figs. 3 to 5.

It will be understood by those skilled in this art that our device is applicable to that type of endless track used for tanks, tractors, trucks and the like which is composed of a plurality of separate tread blocks 10 united in link fashion to form the endless track. Such tread blocks are quite often formed of rubber in which are embedded crossbars 11, two to each block, the exposed ends of which serve as link pins for the end connectors. The blocks 10 are cut away as shown at 10a to permit them to pass around sprockets and guide wheels.

Figure 1:
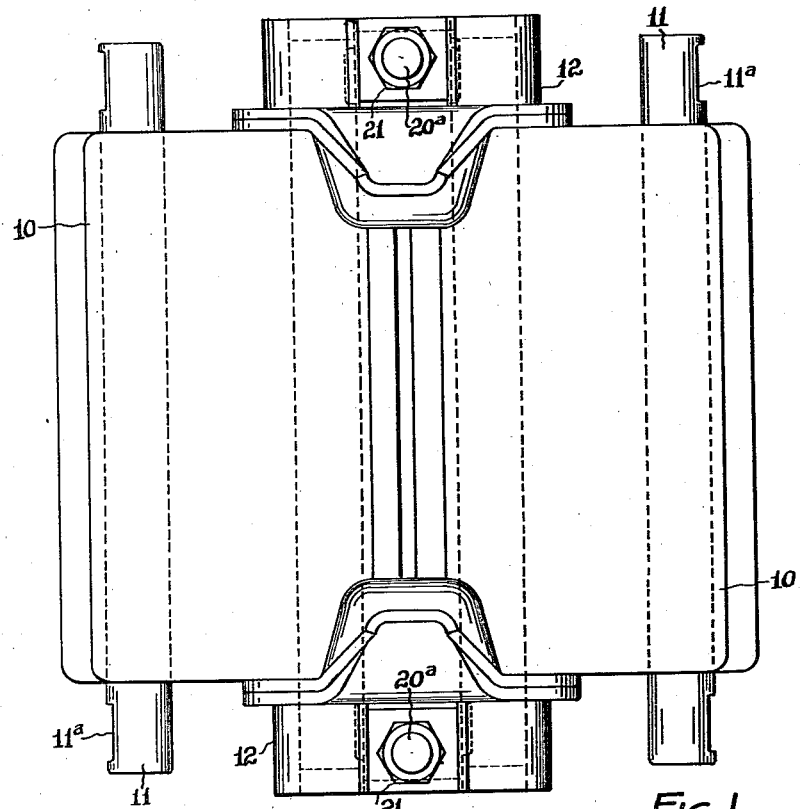
Fig. 1 is a plan view of a portion of an endless track equipped with our improved track guide and connector.
Figure 2:
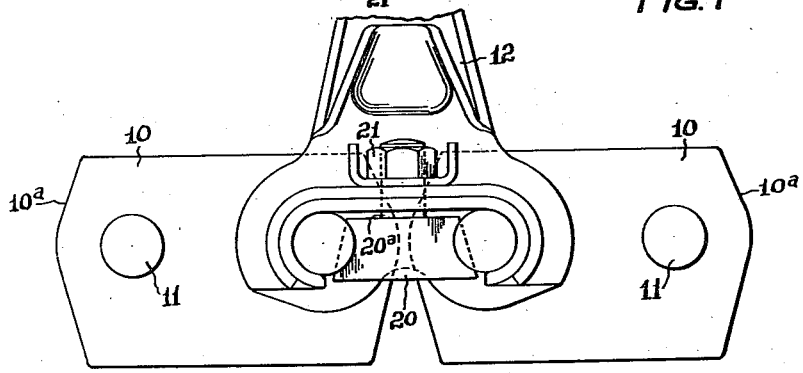
Fig. 2 is an end elevational view of the track of Fig. 1.

The present invention has to do with the combined end connector and track guide indicated at 12 in Figs. 1 and 2. This device has three functions, namely, it provides a connecting link between the crossbars of adjacent blocks so as to tie the blocks together into an endless track; it also is formed with an upstanding projection which prevents the track from slipping off the bogie wheels and sprockets; and thirdly, it provides a bearing surface for the sprockets which drive the track.

This device 12 is here shown as comprising four stampings. The main stamping 13 as best seen in Figs. 6, 7 and 8 comprises a link portion 13a lying generally in a plane and provided with openings 13b to receive the crossbars 11. The stamping is bent inwardly at 13c providing an offset portion substantially at right angles to the link portion. The stamping is then bent upwardly at 13d to provide a track guide portion to keep the track from slipping off the bogie wheels and sprockets. At its outer or free end 13e this guide portion is flared outwardly to give smoother engagement with the guide wheels. The guide portion is strengthened by the side or edge flanges 13f which extend from the free end of the guide portion down to the offset portion at the plane of the link portion. The general effect is to provide a cupping of the stamping at its upper end.

A second stamping 14 best seen in Figs. 9, 10 and 11 has a substantially flat portion 14a parallel to and welded to the link portion 13a of the main stamping. Integral with this portion 14a is a C-shape flange 14b adapted to embrace a pair of adjacent crossbars 11 as best seen in Figs. 3 and 4. This flange has an opening 14c to receive a locking bolt. The stamping 14 is bent inwardly at 14d generally parallel to the offset portion 13c and spot or projection welded thereto. The upper end of this stamping at 14e is generally parallel to the guide portion 13d and welded thereto. The upper end of this stamping is cupped out providing the side flanges 14f which further strengthen the guide portion 13d.

A third stamping 15 is C-shape parallel to the flange 14c and lying inside the same and having its end portions registering with the openings 13b. The stamping 15 is spot or projection welded to the flange 14c and is arc welded thereto at the points 16. This stamping has an opening 15a which registers with the opening 14c.

A fourth stamping 17 is generally of channel form, arc welded to the flange 14c at the points 18 and arc welded to the link portion 13a at the points 19. This reinforces the flange 14c particularly at the point where the lock bolt is inserted. This stamping is provided with an opening 17a to receive a lock bolt.

Referring to Figs. 1 and 2, it will be noted that the crossbars are notched at 11a to receive the locking piece 20. This piece has an upstanding central stud 20a which passes through the openings 15a, 14c and 17a and is secured in place by a nut 21. This locks the member 12 to the crossbars 11 of adjacent tread blocks.

The welding at 16 is ground flat in line with the bottom surface 22 of the stamping 14 so as to provide a smooth surface for the attachment of a grouser.

What we claim is:

1. In the combination of an endless track composed of tread blocks having crossbars and wherein the track travels over sprocket or bogie wheels, a combined track guide and end connector for said crossbars comprising a sheet metal member having a link portion adapted to connect crossbars of adjacent tread blocks, said member having an offset track guide portion formed by bending said sheet metal inwardly and then upwardly in a direction opposite to said link portion, a plate member secured to and reinforcing said offset portion, said plate member having a portion generally parallel to and welded to said link portion, and flange means on said generally parallel portion of said plate member adapted to embrace said crossbars.

2. In the combination of an endless track composed of tread blocks having crossbars and wherein the track travels over sprocket or bogie wheels, a combined track guide and end connector for said crossbars comprising a sheet metal member having a link portion adapted to connect crossbars of adjacent tread blocks, said member having an offset track guide portion formed by bending said sheet metal inwardly and then upwardly in a direction opposite to said link portion, a plate member secured to and reinforcing said offset portion, said plate member having a portion generally parallel to and welded to said link portion, and said plate member having a C-shape flange adapted to embrace two adjacent crossbars.

3. The combination of claim 2 including a sheet metal member generally parallel to and welded to said C-shape flange.

4. The combination of claim 2 including a reinforcing member welded to said flange and to said generally parallel portion of said plate member.

5. The combination of claim 2 including reinforcing ribs generally parallel to said crossbars and connected between said flange and said generally parallel portion of said plate member.

6. In the combination of an endless track composed of tread blocks having crossbars and wherein the track travels over sprocket or bogie wheels, a combined track guide and end connector for said crossbars comprising a sheet metal stamping having a link portion lying generally in a plane and adapted to connect two crossbars of adjacent tread blocks, said stamping having an offset cupped track guide portion extending in a direction opposite to said link portion, and a second sheet metal stamping having a cupped portion welded to said track guide portion, said second stamping having flange means for embracing said crossbars.

7. In the combination of an endless track composed of tread blocks having crossbars and wherein the track travels over sprocket or bogie wheels, a combined track guide and end connector for said crossbars comprising a sheet metal stamping having a link portion lying generally in a plane and adapted to connect two crossbars of adjacent tread blocks, said stamping having an offset cupped track guide portion extending in a direction opposite to said link portion, a second sheet metal stamping having a cupped portion welded to said track guide portion, said second stamping having flange means for embracing said crossbars, said flange means being of C-shape, and a third stamping of C-shape generally parallel to and welded to said flange means.

8. In the combination of an endless track composed of tread blocks having crossbars and wherein the track travels over sprocket or bogie wheels, a combined track guide and end connector for said crossbars comprising a sheet metal stamping having a link portion lying generally in a plane and adapted to connect two crossbars of adjacent tread blocks, said stamping having an offset cupped track guide portion extending in a direction opposite to said link portion, a second sheet metal stamping having a cupped portion welded to said track guide portion, said second stamping having flange means for embracing said crossbars, said flange means being of C-shape, a third stamping of C-shape generally parallel to and welded to said flange means, and a fourth stamping of channel shape welded to said flange means and to said second stamping near said link portion, said fourth stamping having flanges parallel to said crossbars.

RUDOLPH I. SCHONITZER.
EDWIN L. ALLEN.
HAROLD B. MUSTER.